INVENTOR.
Daniel Silverman

July 30, 1968 D. SILVERMAN 3,395,401

DIGITAL INFORMATION RECORDING SYSTEM WITH SIMULTANEOUS TRAVERSE OF RECORDING MEANS AND RECORDING MEDIUM

Filed March 30, 1964 4 Sheets-Sheet 2

INVENTOR.

Daniel Silverman

INVENTOR.
Daniel Silverman

July 30, 1968 D. SILVERMAN 3,395,401

DIGITAL INFORMATION RECORDING SYSTEM WITH SIMULTANEOUS TRAVERSE OF RECORDING MEANS AND RECORDING MEDIUM

Filed March 30, 1964 4 Sheets-Sheet 4

INVENTOR.

Daniel Silverman

United States Patent Office 3,395,401

Patented July 30, 1968

3,395,401

DIGITAL INFORMATION RECORDING SYSTEM WITH SIMULTANEOUS TRAVERSE OF RECORDING MEANS AND RECORDING MEDIUM

Daniel Silverman, 5969 S. Birmingham, Tulsa, Okla. 74105

Filed Mar. 30, 1964, Ser. No. 355,690
35 Claims. (Cl. 340—173)

ABSTRACT OF THE DISCLOSURE

This invention covers the class of digital information recording systems for which the information to be recorded is supplied at irregular time intervals and the recording medium must move intermittently in relation to the arrival of information in order that the final record will have uniformly spaced patterns of spots of information. This system utilizes a temporary storage means to act as a buffer for the time period between the arrival and recording of the information and recording means which are adapted to move along the recording medium simultaneously with the intermittent advancement of the recording medium.

The rate of response and movement is greater for the recording means than for the medium, and since the information to be recorded must be received before either the recording means or medium can be given the command to move, the buffer storage is required to hold the information until the recording means and medium are in the proper relative position. This relative position is determined by counter means responsive to movement of the recording means and movement of the recording medium. The recording means can be a single means adapted to be physically moved along the direction of movement of the medium, or it can be a plurality of separate fixed means mounted in an array along the recording track, with the recording signals switched from one to another of the recording means. Or the recording means can be cyclically moved along the recording track. The recording means can be magnetic, photographic, or electrographic.

This invention relates generally to the field of recording and storing of information, and particularly to the recording of digital information. It is more particularly concerned with the recording of digital information in sequential, intermittent, nonuniform time order for recording on a strip record in the form of uniformly spaced spots of information arranged in at least one column along the length of the record strip.

This system is adaptable to any type of recording in which a pattern of spots representing the information is impressed on the record in the form of areas having one or more different properties from each other and/or from that of the record strip material itself. These spots can be recorded photographically, electrographically, xerographically, magnetically, or by any other possible method. While the processes and apparatus apply to all of these means of recording, they will be described primarily in terms of photographic and magnetic recording, with the understanding that the principles involved apply equally well to all of the methods.

It is quite conventional in digital systems in use today, as reported in the literature, to record digital information in the form of uniformly spaced spots along a record strip. The most common is the magnetic recording tape in which spots, or magnetized areas, are arranged in uniform spacing in columns or tracks along the strip or tape. Any number of such tracks can be used—7 per one-half inch wide tape is quite common, and longitudinal spacings of 200, 550, 800, or more spots per inch are common.

These tapes are generally recorded by driving the tape at a constant speed past a recording head to which uniformly timed pulses of current are supplied. The pulses of current are timed by a precise oscillator or "clock," and the tape is driven by constant speed motors to provide the uniformly spaced spots.

There is another type of digital recording used where the information to be recorded is generated at an irregular time rate. In this case the recording strip cannot be run at constant speed since the spots will then be arranged in nonuniform intervals along the strip.

This type of recording is exemplified by the paper tape punch and punched paper tape strip. Assume, for example, that the information to be recorded comes from a typewriter. As a key is pressed, the character corresponding to that key is identified by a prearranged code of spots or bits (there are 5, 6, 7, or 8-bit/word tapes) which will be punched into the tape as a pattern of holes arranged across the tape. The tape is then advanced a distance equal to the desired longitudinal spacing between spots until the next character is to be recorded, etc. The recorder must be designed to record a character on signal and quickly move the tape one unit of length and then be ready to receive the next signal.

This is a rather slow process because of the intermittent character of the signal and the mechanical systems involved. Speeds of from 20 to 50 or more characters per second are possible with refined and specially designed tape perforators. By going to magnetic recording, which eliminates the inertia of the mechanical punches, the recording speed can be increased up to 200–250 characters per second. Here the limit is reached by the inertia of the tape and of the motor that drives the tape which must be started and stopped within the time of 1/200 or 1/250 second.

This invention is adapted to use the best and fastest motor and strip drive systems which are available today, but by means which will be described, the speed of recording can be increased by a factor of 10 or more, which places this type of recording in the range of speed of the constant speed recording systems.

Briefly, my invention involves the use of a motor and tape drive which is intermittent in character, in which the motor, on signal, will advance one unit length of tape (the spacing between spots). If a second item of information or character should arrive before the motor has moved the tape one complete unit of length, then the second spot will not be properly spaced from the first spot. And, for example, if the second character arrives before the motor has started to move, the two characters will be printed one over the other, with the resulting loss of information.

While using the conventional motor and tape drives, this invention contemplates also the additional steps of moving the recording unit or recording means, which by proper design, can be moved over a limited range more rapidly than can the motor and tape. Thus depending on the actual position of the motor in relation to the position it should be in for the number of character signals applied and the number recorded, the recording means is advanced along the tape by the appropriate amount to position the recorded spot at the correct position on the tape.

Consider, for example, that the recording is by photographic means on a strip of film. Assume a single column of spots and that a CR tube is the source of luminous energy. This spot is focused on the film, and when the beam is brightened a spot will be recorded. Assume that the film moves along the Y direction of the beam deflection. Then by shifting the spot, the image can be placed on the film at any desired position. The proper position of the spot to be recorded can be determined by noting the instantaneous position of the motor and tape, determining where the motor and tape should be in view of the previous characters recorded, and positioning the beam and spot at that point on the film. As the motor finally catches up and comes to rest, the recording beam will return to the zero of the Y axis.

Thus this invention takes account of the rapid deflection of recording points possible with some recording systems, and compensates for the limited range of displacement of the recording points by using a slower motor drive to position the tape. Thus the present slow electromechanical systems of intermittent recording are supplemented with a very much faster electronic or electromechanical system, of short range, to provide a much faster over-all intermittent recording system.

It will be clear that by substituting a digital detecting or reading means for the recording means, these same principles can be used to read, intermittently and sequentially the information on a strip.

The principal objective of this invention is thus to provide a much higher speed intermittent digital recorder than is now available. Another important objective is to accept digital signals at intermittent, uneven, time intervals, and to record these signals on a recording strip sequentially at a uniform spacing, all at a much higher rate than is possible with existing equipment. Another objective is to provide an intermittent digital recorder that can accept and record digital signals at rates higher than the rate at which a recording strip can be intermittently traversed by motor means. Another important objective of this invention is to provide an improved method and apparatus for magnetic recording in which the position of the recorded spot of magnetization can be selected at electronic switching speed. Another important objective of this invention is to provide an improved method and apparatus for driving a recording strip, or other linear element, intermittently without the use of high inertia electromechanical parts. Another important objective is to provide a means for driving and reading intermittently and sequentially a linear information record.

The many details and embodiments of my invention and the many purposes and objectives will be better understood by reference to the accompanying drawings forming a part of this application, in the various figures of which, the same reference numerals are applied to the same or corresponding parts.

Figure 7:
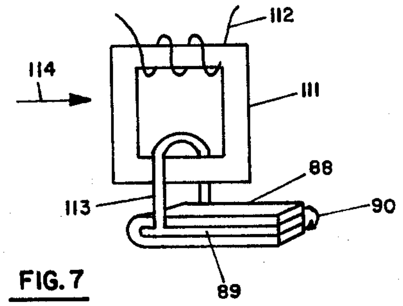
Figure 8:
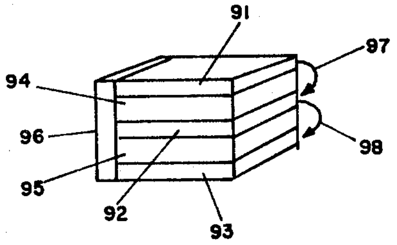
Figure 9:
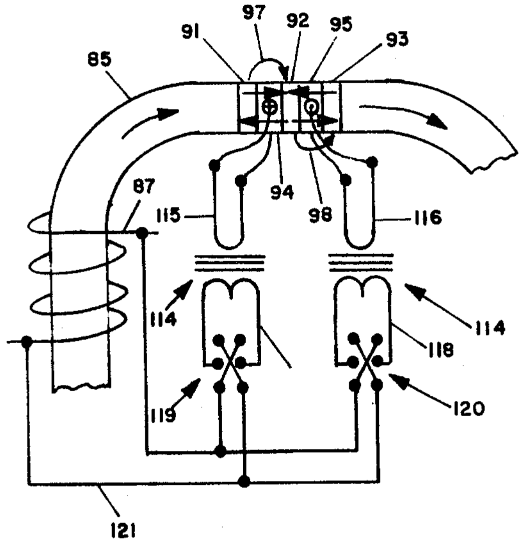
Figure 5:
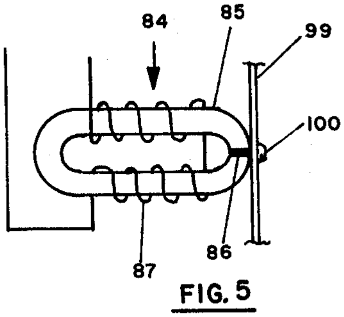
Figures 6, 13:
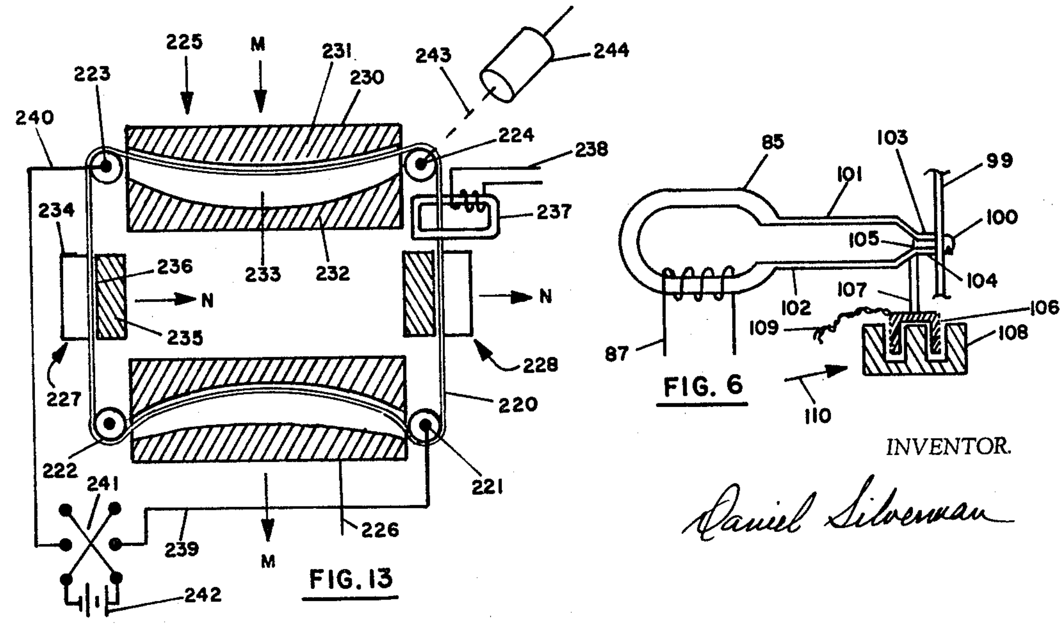

FIGURES 5, 6, 7, 8, and 9 represent embodiments employing magnetic recording means. FIGURE 5 shows the conventional magnetic recording head. FIGURE 6 shows one which has a movable recording gap. FIGURES 7 and 8 show a new type of multigap magnetic head system, and FIGURE 9 shows a combination of the embodiments of FIGURES 5 and 8.

Figure 10:
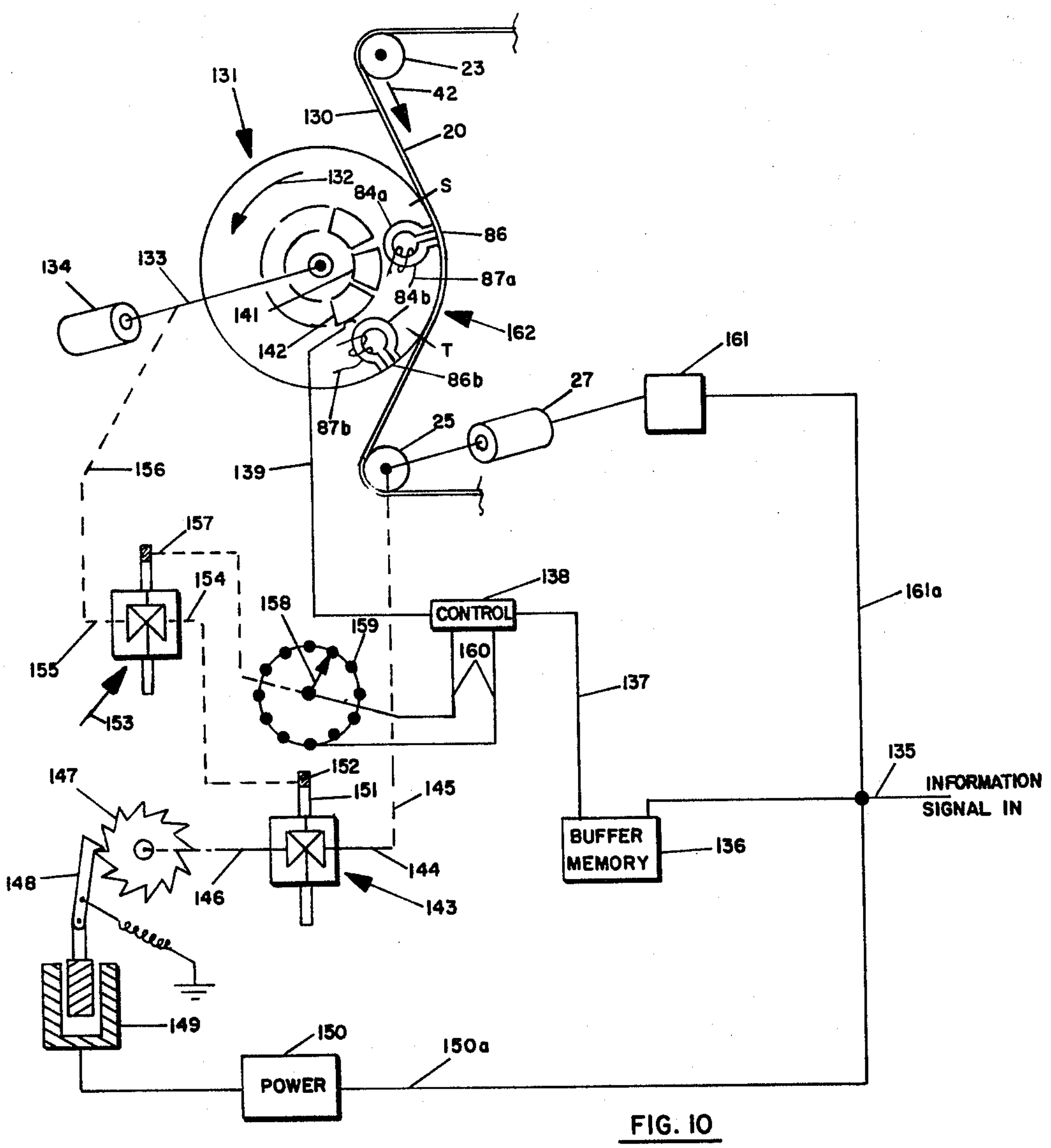

FIGURE 10 shows an embodiment employing a continuously rotating magnetic head system.

Figure 11:
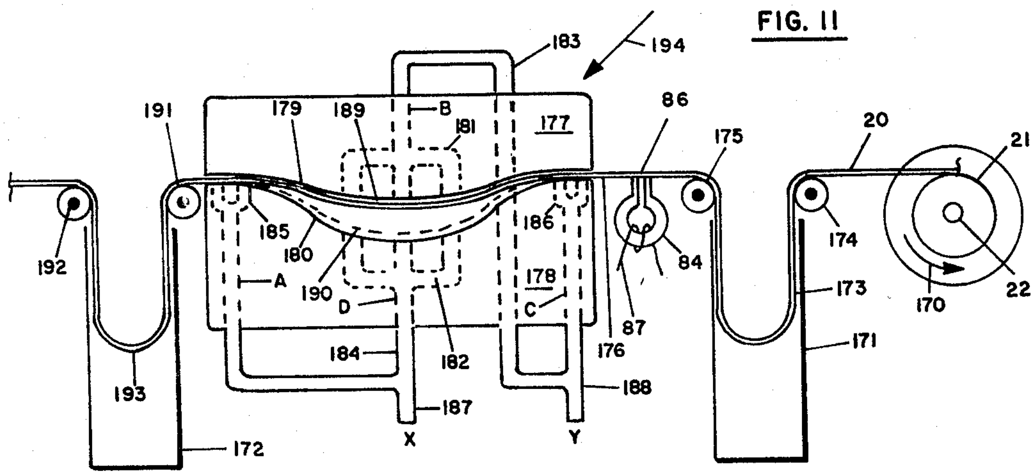
Figure 12:
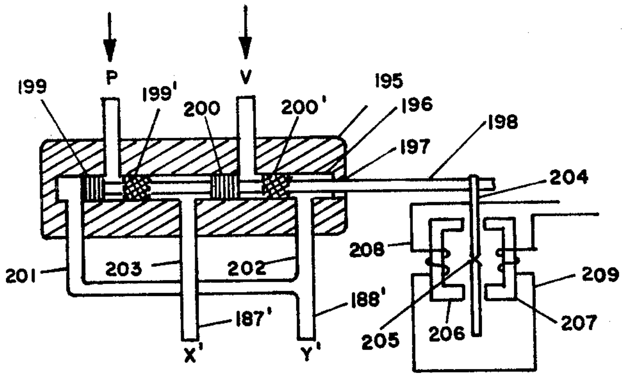

FIGURES 11 and 12 show schematically an embodiment employing a pneumatic type of strip drive that has low enough inertia to follow very rapid pulses of signal. FIGURE 12 illustrates a detail of the pneumatic control, and FIGURE 13 is another embodiment of FIGURE 11 in which an electrical conductor is used as the driven member.

Figure 1:
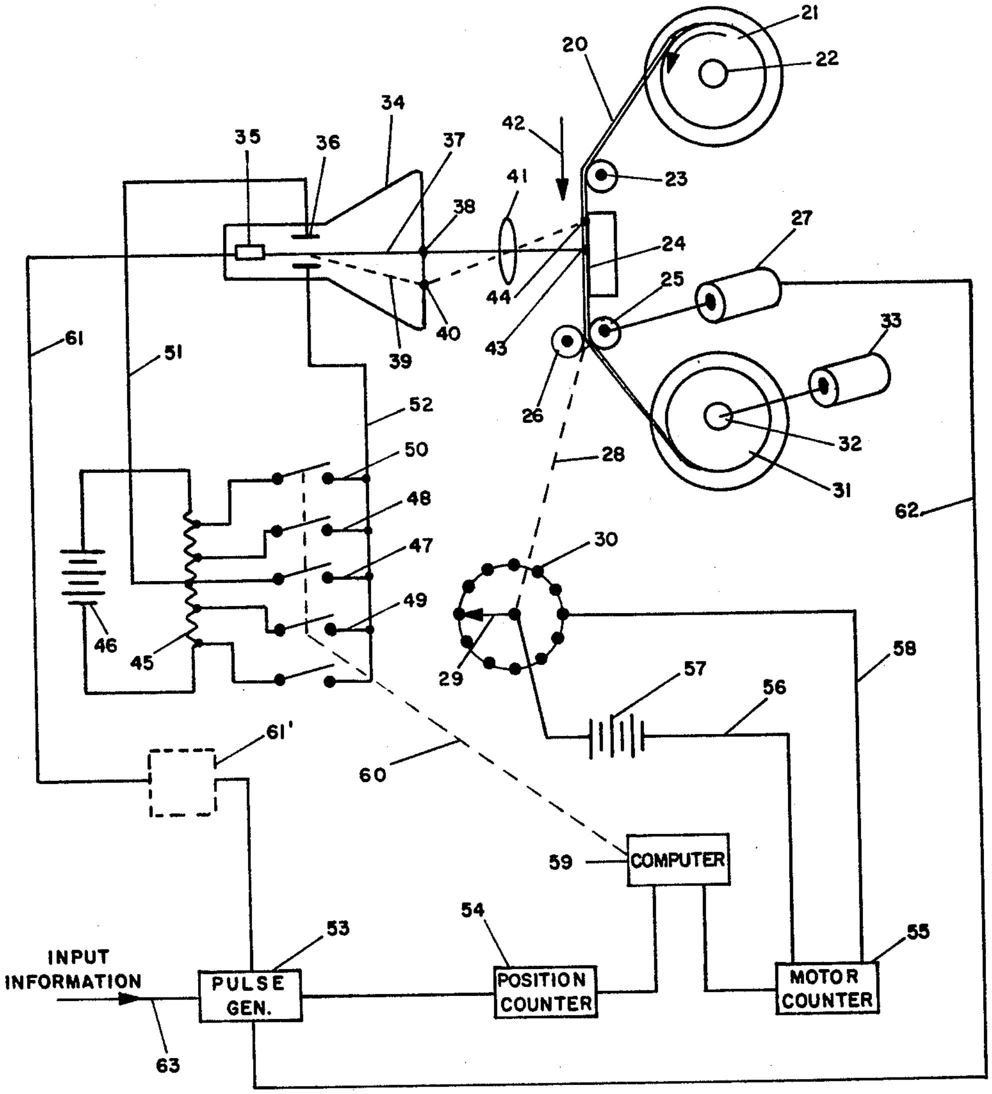
FIGURE 1 represents in schematic form a photographic digital recorder adapted for intermittent operation in accordance with this invention, in which a cathode ray tube is used as a source of recording illumination.

The basic principles of this invention are illustrated in FIGURE 1, which shows a photographic digital recorder designed for intermittent operation. The recording system per se comprises a photographic film strip 20 which is unreeled from reel 21, passes over idler roller 23, over light gate 24 where it is held in proper position for exposure. It is driven in incremental steps by motor 27 driving roller 25 against which the film is held by pinch roller 26. Of course, a perforated strip can be used in conjunction with a sprocket at 25, if desired. The motor 27 through drive means 28, also drives a contactor 29 over a set of contacts 30. Thus the motion of the motor 27 and roller 25 are indicated by the contacting of 29 over 30, indicating by each contact a fixed angle of rotation of the motor 27, and roller 25, and length of film 20. By making the spacing of contacts 30 as small as desired, the position of motor and strip can be determined as closely as desired. The contactor system 29, 30, can, of course, be photoelectric, magnetic, or etc. The strip then goes to take-up reel 31 driven by take-up motor 33.

The luminous spot which is to record the digital information is provided by a cathode ray tube 34 containing electron gun with beam brightener 35, deflection plates 36, beam 37, and spot 38 on the face. When the beam is brightened by signal to 35 the spot 38 brightens and is imaged by lens 41 at 43 on the film, thus recording the information. The signal to 35 is a pulse of voltage of sufficient magnitude and short time to record a sharp spot in spite of possible motion of the film strip 20. When the beam 37 is deflected, say to 39, the spot 40 then is imaged at 44. Thus the sequential recording of spots 43, 44, etc., can be done by deflection of the beam (with only very short time delay) which can be called electronic-controlled or switching-controlled speed or by motion of the film strip (with some considerable time delay, controlled by the inertia of the drive system) which can be called inertia-controlled speed. It is the added feature of the shifting of the recording spot (or, in general, the shifting of the recording element) in combination with the conventional intermittent feed of film that makes this system faster than the conventional. This is particularly true when the shifting of the recording element takes place at electronic or switching speed, as with the CR tube 34.

When the recording of the spot information is dependent on the relative position of two elements of the system, some means are required to tie them together. This is shown in the counters 54, 55, and the computer 59.

Assume that the information to be recorded is in the form of spots arranged in a pattern across the strip and in columns along the strip. Since there is considerable art on the so-called "flying spot" recorders, which use a CR beam moving in the X direction to create a pattern of spots *across* the strip, I will assume for the purpose of this description that there is only one column of spots, and thus the beam 37 only moves in the Y direction.

Information arrives by line 63 and goes to a pulse generator. This pulse goes over line 61 to beam brightener 35 to provide the luminous spot 38. For the first element of information, the strip 20 is at rest and the spot 43 is recorded. The pulse generator at the same time sends a pulse of current by line 62 to motor 27 causing it to advance one unit of angle *a*. This is the correct amount to move the strip one unit of length *h* equal to the spacing of spots along the film strip. Thus the motor and strip advance and the strip is then ready to receive the next spot of information. This can be a spot of negative information (no brightening of the beam) or a spot of positive information (with the beam brightened), that is, a negative or a positive bit. In either case, the pulse to the motor is the same and the strip advances one unit of length *h*. This is quite conventional so far. If the items of information are spaced apart in time a value which is greater than the time for the motor to move film $h$, then all is well. Each bit of information will be recorded in proper position. No further detailing of this mechanism is necessary since there are numerous commercial mechanisms on the market which utilize these features.

In FIGURE 1, I show electronic counter 54 which counts the information pulses from 53. There is also a similar counter 55 counting the pulses from the contactors 29, 30, via battery 57, and lines 56 and 58. If the counts of 54 and 55 are the same, then it indicates that the motor has responded to all impulses from 53 and it is now in recording position. If the motor 27 should overrun, it will show more counts on 55 than 54. If the motor has not caught up with its pulses, it will show fewer counts on 55 than 54. If the rate of supply of information is slow enough, then there will never be a greater difference in counts of 54 and 55 than one, and this will only be for a short interval until the motor catches up. Consider the case where the rate of information input is higher than the speed of the motor. Counter 54 may show 1, 2, or more counts greater than 55. And if the beam brightening takes place with each pulse, the record spots 43 will overlap. This is prevented by the feature of this invention which I will now describe.

Beam deflection plates 36 of the CR tube 34 are supplied with potential from the potentiometer 45 supplied with battery 46. One plate is connected to the midpoint of the potentiometer. The other plate is connected by switches 47–50, etc., to other fixed points on the potentiometer. Switch point 47 corresponds to the same midpoint connection—thus with switch 47 closed there is no potential between plates 36 and the beam 37 is undeflected at 38. If switch 48 is closed the beam is deflected, say to 40 to advance the recording spot one unit of spacing $b$ along the film. If switch 50 is closed, it would be two units $2b$, etc. If switch 49 is closed it would be one unit in the negative direction, etc. It will be clear that the switches 47–50, etc., can be the contacts on a rotary switch or stepping relay, the position of which is controlled by the difference between the counters 54 and 55. Computer 59 is simply a circuit for reading the difference between counters 54 and 55 and closing the appropriate switch. For example, if 54 was greater by 2 counts than 55, switch 50 would be closed. If it was smaller by 1 count then switch 49 would be closed. There is considerable art in the literature on counters and stepping switches, including stepping switches that can be stepped either forward or backward so that no further description is felt to be necessary. There is also considerable art in computer technology in the switching of circuits electronically by use of binary logic. Sources of information on this subject might be the textbooks on computers and computer logic, such as, for example: "Computer Logic—The Functional Design of Digital Computers," by Ivan Flores, Prentice-Hall, Inc., 1960.

Thus it will be clear from the above description how this system works, and no further details of construction are required.

The number of pulses generated by 53 can be equal to the number of information bits, or it can be some multiple of this. By making the number of pulses $d$ times the number of information bits, the position of the film strip, and the deflection of the recording spot can be controlled to a precision of $1/d$ of the spacing of spots on the strip. The larger the number $d$ the more closely can the shifting of the recording spot compensate for the precise position of the strip, and thus permit more rapid recording of information than can be handled by speed of the motor and tape system alone.

However, it will be clear that because of the finite number of switch elements 47–50 etc., there will be a finite number of discrete positions that the CRT spot can assume. Thus in the embodiment of FIGURE 1, the recording means assumes one of a finite number of discrete positions at switching-controlled speed.

Figure 2:
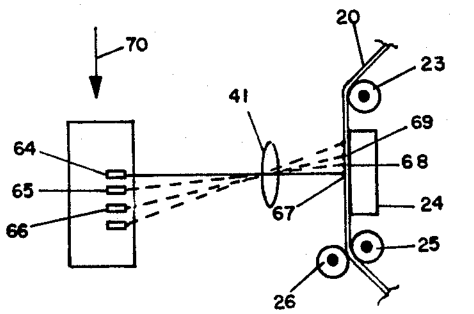
FIGURES 2 and 3 show schematically two other embodiments of optical recording sources that might be used in practicing this invention.

In FIGURE 2, I show an embodiment employing another type of luminous source capable of rapid switching, which can be used to change the longitudinal position of the recording means. This figure shows the same strip and light gate features bearing the same numbers as in FIGURE 1, also the same lens 41 to focus and produce a spot image in the plane of the film. The source of light can be an array of electrical discharge (crater) lamps or glow lamps which contain a pair of electrodes. A luminous area forms about one electrode when a potential is applied to the two electrodes. These discharges can be initiated and terminated in times of the order of fractions of a millisecond or less, so that by electronic switching the discharge can be set up in either one or an adjacent tube. These tubes 64, 65, 66, etc., are focused at points 67, 68, 69, etc. The spacing between the images 67, 68, 69, can be as small as desired by using appropriate optics and thus by proper choice of tube, the image can be placed at the proper point on the strip to compensate for the improper position of the strip at the instant an item of information is received. In operation, the tubes 64, 65, 66, etc., would receive their operating potentials from the switches 47–50, etc. Thus, as in the case of FIGURE 1, in the embodiment of FIGURE 2, the recording means assumes one of a finite number of discrete positions at switching-controlled speed.

Instead of separate tubes 64, 65, 66, etc., the source 70 can be a large discharge tube in which are placed a whole pattern of electrodes, about any one of which the discharge can be formed by applying the proper potential. Thus one multielement tube may be able to provide a closer spacing of luminous spots, if this may be necessary, than can be separate glow tubes.

Figure 3:
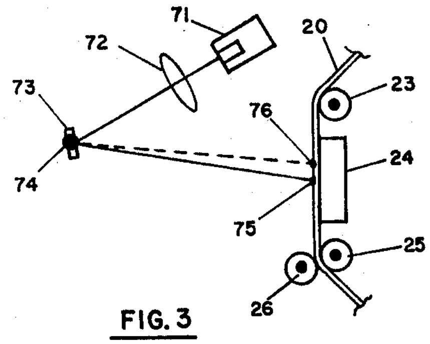

Another way in which the image of a luminous spot can be traversed along the strip is by optical means. In FIGURE 3, I show a similar recording set up as in FIGURE 2, except that I use a single crater lamp 71, optics 72, and mirror 73 to provide an image of the luminous spot at 75. The mirror has a horizontal axis of rotation 74, and by rotation, the image can be positioned at any desired spot such as 76. The mirror can be mounted on a D'Arsonval galvanometer (not shown) for example, and by adjusting the current through the galvanometer coil the position of the spot 75 can be varied. While the galvanometer system is electromechanical and has some inertia, it has a high resonance frequency and will, in general, be able to respond much more rapidly to a sharp pulse than will the motor and film strip.

If the system of recording is xerographic, it is possible to place an array of electrodes or conducting wires placed perpendicular to the record strip (which can be a simple paper or plastic strip) and spaced a very short distance from the strip. By placing a sharp electrical pulse on a wire, a short time discharge will take place at the wire tip and ions will be driven to the strip, where they will stay and constitute a small charged area of the strip. Then by applying colored xerographic powder to the strip the charged areas attract the powder, and by means well known in the art the powder is fixed.

Figure 4:
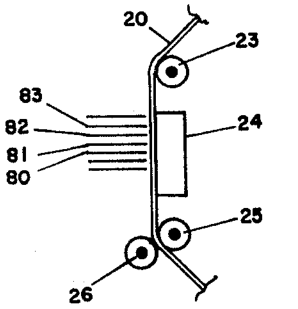
FIGURE 4 shows schematically an embodiment employing a xerographic recorder.

With the kind of switching system 47–50 etc., shown in FIGURE 1—the pulse along wire 61 can be directed to the appropriate electrode 80, 81, 82, etc. of FIGURE 4 to make a colored spot at the proper point on the strip. This embodiment, like those of FIGURES 1 and 2, has very speed to response and is another system in which the recording means assumes one of a finite number of discrete positions at switching-controlled speed.

If the wires 80, 81, 82, etc., are in contact with the strip, and if the strip is made of suitable electrographic paper, a rapid marking or recording of the bit information onto the strip can be carried out rapidly and simply.

The same procedure illustrated above for the photographic, xerographic, and electrographic processes can also be provided for the magnetic recording process. However, it is not quite as simple to design a magnetic recording head which has a dimension perpendicular to the gap (that is, along the direction of the tape) of a few thousandths of an inch. In FIGURE 5, I show schematically a conventional magnetic recording head 84. This comprises a stack of U-shaped laminations 85 with a short air gap filled with non-magnetic material 86 and a coil 87 interlinking the core. By applying a current to 87 a flux is set up in the core which fringes out 100, at the air gap 86. If a strip 99 with a coating of magnetizable material is placed over the gap, the fringing flux will magnetize the strip of tape.

To accomplish the objectives of this invention we must either rapidly move the head 84 along the strip, or have a series of heads spaced at short intervals along the strip. Both of these objectives can be accomplished. Instead of moving the head, however, I propose (as in FIGURE 6) to extend the gap 105 away from the laminations 85 by means of thin leaf springs 101, 102 of magnetic material leading to pole pieces 103 and 104. The gap can be filled with nonmagnetic material 105. The moving system 101, 102, 103, 104, 105 is quite small and of low mass and when driven by an electromagnetic driver 110 may have a much higher speed of response than the motor and strip. One possible drive is to use an electrodynamic coil 106 and magnet 108 with a nonmagnetic push rod 107. The output signal from the computer 59 of FIGURE 1 would go to the driving coil 109, while the signal pulse would go to magnetic write head coil 87 while the air gap of FIGURE 6 can be positioned to a continuous range of positions, it is limited in speed of response due to the inertia of the moving parts. Its speed is therefore inertia-controlled.

In FIGURE 7, I show a simpler magnetic recording head which comprises a narrow U-shaped channel 88 of magnetic material of the proper properties and a conductor bar 89 inside the U. The conductor is preferably insulated from the magnet channel. By using a step down transformer 114 with core 111, primary high impedance winding 112 and single turn secondary 113, and by feeding the secondary current through the conductor 89, a fringing flux 90 will be provided across the open end of the U. By proper design the magnetizability of this unit 88, 89, should be as great as that of 84, if the primary 112 has the same number of turns as the coil 87.

The particular advantage of the embodiment 88, 89 is its small dimension along the tape. In FIGURE 8, I show an assembly comprising a series of short strips 91, 92, 93, etc., of thin magnetic material alternated with thin strips of conducting material 94, 95, and with the gaps closed at one edge of the strips with a magnetic strip 96. This provides a multiplicity of closely spaced narrow U-shaped channels, each with its own conductor inside the U. If each conductor 94, 95 is connected respectively to a single turn secondary 113 of a transformer 114, this array of write heads can then act like the array of luminous spots of FIGURE 2. By switching the signal pulses from one to another of the coils 112, the recording point can be moved along the strip to any desired position.

In FIGURE 9, I show a combination of FIGURES 5 and 8. The same numbers indicate the same parts as in the other figures. The conductors 94, 95 are shown fed from the secondaries 115, 116, respectively, of the transformer 114. The primaries 117, 118 are connected to electronic reversing switches shown schematically as 119, 120. By connecting the primaries as indicated by the marked direction of current in the conductors, the fringe flux 97 will be on the "outside" edge and 98 will be on the "inside" edge (away from the recording strip). By reversing the switches, the fringing fluxes will change to the other edges, that is, 97 will be on the inside and 98 on the outside. Thus the position of the recording gap will be shifted along the recording head by the spacing between 94 and 95. As was indicated in connection with FIGURE 7, it may be desirable in the embodiments of FIGURES 8 and 9 to apply insulation between the conducting strips 94, 95 and the magnetic strips 91, 92, 93 as is well known in the art.

In FIGURE 10, I show another embodiment of my invention in which, as in the preceding embodiments, the recording means is moved to place the recording means at the proper position on the strip at the proper time. In the preceding embodiments the recording means is moved after the information signal has arrived, and the recording means is positioned at the proper position in view of the preceding arrivals of units of information and the present position of the strip. In the present embodiment the recording means is continually moving over a fixed range of length of the strip, and by noting the actual position of the strip and determining the proper position on the strip, a comparison is made between the moving recording means and the strip until the recording means is at the proper position, and the recording is then made. It will be clear that the moving recording means will not always be at the proper position at the instant the information signal arrives, so there must be some buffer storage—some temporary means to hold the information signal until the above coincidence is reached. Some short time delay storage or buffer memory may also be required in the other embodiments. This is shown as 136 in FIGURE 10 and in the dotted outline 61' in the line 61 of FIGURE 1. The amount of this delay will be a function of the speed of response of the tape drive means and the positioning of the recording means.

In FIGURE 10, I show the recording step 20 which in this case will be assumed to be a magnetic recording tape, although it could equally well be the photographic recording strip of FIGURE 2, etc. As in FIGURE 1, this strip is driven by motor 27 through rollers 25 and 26 to take up reels not shown. The magnetic coating is on the side 130 of the strip or tape. The strip runs over the surface of the rotating circular head structure 131 which rotates in the direction 132. This head structure is a circular drum of nonmagnetic material in which is inserted one or more magnetic heads 84*a*, 84*b*, etc., with their gaps 86*a*, 86*b*, flush with the surface. Thus, as the strip moves in the direction of the arrow 42, while the drum 131 revolves on the direction of the arrow 132 under the drive effort of motor 134, there will be a continuous sweep of one or another of the heads 84 along the strip 20. Thus the recording can be placed at any position along the strip by sending the recording signal to the heads at the proper instant.

Consider the information signal arriving at line 135. This then goes to a temporary buffer storage 136. This can be a core storage or bank of relays or bistable multivibrators or similar means as is well known in the art for storage of digital signals. It is taken out of storage 136 by the leads 137 and control unit 138, and is delivered by lead 139 to the recorder.

The instant at which the signals are applied to the recording heads depends on the relative position of the head and the tape and the position on the tape of the last recorded information. It is thus necessary to take account of the number of units of information received, the travel of the drive motor 27 or reel 25 or tape 20 (all which are tied together) and to take account of the instantaneous position of the recording head 131. This can be done on electrical or mechanical computers. This can be a simple computer which can be built in analog form, as will be described, and as is well known in the art. Or it can be built in digital form, as is well known in the published computer art. See, for example, one of the many textbooks on the computer design.

In FIGURE 10, I show a mechanical differential mechanism 143 with inputs 144 and 146 and output 151. I also show another differential 153 with inputs 154 and 155 and outputs 157. Input 144 of 143 comes from the strip drive by way of drive 145. This input represents the true present position of the strip. The other input 146 comes from a ratchet wheel 147 driven by pawl 148, which is driven by solenoid 149. The input to the solenoid comes from a power source 150 at the control of the input information signal via lead 150*a*. Thus with each new unit of information a pulse is sent to the solenoid and shaft 146 is advanced one step. At the same time a pulse is sent to motor 27 from power source 161 triggered by signal on lead 161*a*. These power sources 150 and 161 and the means by which they are triggered by pulses of signal are well known in the art and will not need to be detailed further. So the pulse at 135 triggers the solenoid 149 and motor 27. Input 146 advances one step and the motor 27 and input 144 advance to catch up. The difference in shaft rotations is reflected in the output shaft 152, and represents the proper position on the strip of the next signal to be recorded with respect to a fixed point, say 162. This point 162 also represents a fixed angle of position of the revolving head structure 131. The actual position of the heads is carried by drive 156 from motor 134. This motor 134 drives the head structure 131 by shaft 133. The motor is preferably a constant speed motor although this is not essential. The heads 84*a*, 84*b*, etc., are connected to commutator segments 141, 142, etc., and a brush 140 contacts these segments in such a manner that only one head is connected at a time, in particular that head which is in a position between angles S and T, representing the range of contact of the strip to the heads. Thus there is a continuous procession of recording heads rotating from T to S contacting the strip 20.

The output of 143, that is, shaft 152, represents the position with respect to 162 of the position on the strip that the next signal is to be recorded. This input goes to differential 153 as input 154. The other input 155 represents the instantaneous position of the recording head. The output 157 thus represents the difference in position of the head 84 with respect to the proper recording position. This output 157 goes to a rotating contractor 158 and a series of contacts 159. Whenever this difference in position is zero, contact is made between 158 and 159 and the control 138 is told to pass the information signal through 139 to brush 140 and to head 84 to make the recording.

While this system is fully workable, there are other faster electronic computer means that might be used to carry out these simple computations and to control the recording instant. In this case digital shaft position encoders would be used on the shaft of motor drives 27 and 134 and their outputs would go to counter circuits, as is well known in the art. The particular type of computer that carries out this computation is not critical, and the man skilled in the art might design variations of this analog system or corresponding digital systems to make the same calculations.

Thus in FIGURE 10, I show a system which can receive a unit of information. The information goes into temporary storage. At the same time a signal of the arrival of the information goes to the computer. A pulse goes to the strip drive motor to advance the strip, and the exact position of the strip goes to the computer. Also the head system has been rotating and the instantaneous position of the head goes to the computer. Finally, when the head reaches the proper position on the strip the signal is passed by the control and is recorded on the strip. This same process is repeated each time a signal arrives. If the rate of arrival of information signals is very high, that is, the time intervals shorter than the travel time of the heads between T and S, then it may be necessary to (1) speed up the motor 134, or (2) add more storage units to 136 so that a multiplicity of information units can be stored. This adds complication and cost, but is well known in the art, and will permit much more rapid acceptance of information signals.

It will be clear also, that the use of a storage like 136 can be combined with the features illustrated in the other embodiments, to increase the rate at which information can be received and recorded.

The magnetic heads 84 of FIGURE 10 are described as recording means, for recording magnetized spots on a suitable strip medium. A corresponding system can be designed with a magnetic read head 84 in place of the record head. This will permit the intermittent readout of digital information from a record strip at a much higher rate of units of information per unit of time than would be possible with an intermittent drive motor and a stationary read head. Thus the principles of this FIGURE 10, and of all the other embodiments, will operate with the substitution of suitable detector means in place of the recording means illustrated.

The present conventional method of driving the strip or tape in intermittent digital recorders of the type being considered in this invention is by conventional D-C or universal motors, or by means of step motors. These are multipole D-C motors which have specially designed pole pieces such that when a pulse of current is applied to the field structure the armature will advance by a fixed angle or step to a new position of equilibrium, where it will stay until the next pulse of currents. The design may be such that succeding pulses should be in the same polarity or in opposite polarity. While there is considerable old art on this type of step motor, there are currently some new principles of design which provide motors which will advance by a fixed angle in response to a pulse and will respond at rates of many hundred per second. The specific design of drive motor, be it conventional or step, is not part of this invention. By way of example, however, it may be pointed out that there is a model called "Cyclonome Stepping Motor" manufactured by the Sigma Instruments, Inc., of Braintree 85, Mass., which appears to have many advantages in this application.

One of the problems in designing a very rapid intermittent motor is the effect of the mass or inertia of the moving parts. Since the inertia of the moving parts of a step motor are much less than those of the conventional paper tape punches, the former can operate at a faster rate than can the latter. There is a method of advancing the strip in the recording gate without mechanical drives which I wish to describe as part of this invention.

Consider FIGURE 11. I show the strip 20 being reeled off a supply reel 21 passing over roller 174 into a conventional vacuum chamber tape drive 171 that provides a loop 173 of tape. This loop of tape provides a buffer of low inertia between the tape driving means ahead and the high inertia supply reel 21. This has widespread use in conventional strip records, and is well known in the art. The tape then goes over roller 175, over recording head 84, with coil 87, then into the drive means 194, then over roller 191 into the take-up vacuum chamber 172 to provide loop 193, then over roller 192 to the take-up reel, not shown. All of this except the driver 194 is quite conventional.

The driving means 194 comprises a top section 177 and a lower section 178. These are metal or plastic blocks of suitable length (along the direction of strip drive) and are slightly wider than the strip width. They have side walls (parallel to the surface of the drawing) which enclose a channel through which the strip runs. The shape of this chamber is fairly critical. The lower surface 179 of the upper section 177 is slightly convex downward so that under the slight tensions of the vacuum loops 173 and 193, the tape will lie snugly against this surface as in position 189. There are internal conduits 181 in upper portion 177, and conduits 182 in lower portion 178. The conduits 181 called B, connect to a pipe 183. Conduits 182 called D, connect to a pipe 184. Now when pressure is applied to B, and vacuum to D, the strip will move from position 189 to position 190 along the top surface 180 of lower portion 178. The length of surface 180, is greater than that of 179, by a fixed increment of length L. This length L can be made anything desired by shaping the surface 180. Usually, it will be the length of strip between adjacent rows of bits.

The lower section 178 also has additional conduits. Conduits 186 at the input end of 194 called C go to outlet pipe 188, which is joined also by pipe 183. At the output end of 194 there are conduits 185 and 178. These are called A and are jointed with 184 to form outlet pipe 187. When a vacuum is applied to 188, or Y, the strip 20 will be held close to the lower surface of the channel at 186. The same vacuum at Y will hold the strip in contact with the upper surface 179. In this condition the tension of vacuum loop 193 will pull the strip tight over roller 191.

Consider now what happens when a vacuum is applied simultaneously to X. The strip will be locked down against the lower surface 180 at the region of 185. The strip will not move from position 189 to 190, because it is held by vacuum at 181, also the strip is held by vacuum at 186. If the vacuum is removed from Y and pressure applied instead, then the strip will move from 189 to 190. Now since it is locked at 185, and since the length of surface 180 is greater by length L, than 179, and since the strip is released by the pressure at 186, there will be a length L drawn into 194. Thus the strip will move a length L across the recording head 84.

Now if vacuum is again applied to Y, the strip will be locked at 186. And if pressure is applied at X, then the strip is released at 185, the strip moves to position 189, and the excess of length L is pulled over roller 191 by the tension in the vacuum loop 193. Thus by selective intermittent application of pressure and vacuum to the drive means 194, the strip can be advanced intermittently in steps of length L. The speed at which the strip moves into the space 194 is greater than the speed at which it moves out because the driving effort of pressure on B and vacuum on D is greater than the take-up tension of loop 173.

Another way to indicate the position of the strip is to prepare the strip in advance with appropriate markings along its length—along one edge, for example. These would be easily recognized markings, equally spaced and related in spacing to the spacing between digital spots. This relation would preferably be one to one. Then an appropriate detector along the surface 176 would indicate the movement and precise position of the strip.

Means for generating pressures and vacuums are well known in the art. Means for controlling pressure and vacuum are also well known. A conventional system is shown by way of example in FIGURE 12, the exact manner of control is not critical, only the sequence, and the speed.

In FIGURE 12, I show cylinder 195 with a cylindrical bore 196. One end of the bore is closed, and the other end has a packing gland 197 to seal pressure around a slender piston rod 198. The piston rod is driven by an electromagnetic motor. This can be of the electrodynamic type or any other, which will provide sufficient force at a high enough repetition speed. This driver comprises an armature 204 pivoted at 205. There are two U-shaped laminations 206, 207, on opposite sides of the armature, each with drive coils 208, 209, respectively. By applying a pulse of current of one polarity to the two coils in series, the top of the armature will move in one direction, with a current of the other polarity, it will move in the opposite direction. Thus an alternating current applied to the coil will cause the armature and the piston rod to move in synchronism.

There are two pistons 199 and 200 on the piston rod. There are also openings P, V, and 201, 202, and 203. Openings 201 and 202 are connected to pipe 188′ or Y′ and opening 203 is connected to pipe 187′ or X′. The pipes X′, Y′, of FIGURE 12 are connected to the pipes X, Y, of FIGURE 11. Air pressure is applied to P and vacuum to V. In the shown position of pistons 199 and 200, pressure from P goes to X′ and vacuum V goes to Y′. At the other limit of piston travel 199′, 200′, the pressure P goes to Y′ and vacuum to X′. Thus a single movement of the piston rod 198 from one end of its short motion to the other causes a change from pressure to vacuum, or vice-versa, in the conduits of 194. A complete movement back and forth of the connecting rod carries out a complete cycle of advancement of the strip. By making the armature, piston rod and pistons as small and light as possible, very high rates of control of the air flow can be made, and thus a very rapid rate of intermittent advancement of the strip can be achieved.

In FIGURE 13, I show a variation of the embodiment of FIGURE 11, in which a closed loop of conducting wire 220 is looped around four small, low-friction rollers 221–224. There are four magnetic field assemblies 225–228, respectively, such that by application of current through the wire causes the wire to move transverse to the magnetic fields in the gaps. By the use of nonmagnetic spacers within the gaps, the transverse motion of the wire is controlled so as to move it longitudinally as it vibrates transversely.

Consider the magnet assembly 225, for example. The outline 230 represents in section a magnetic pole piece. The flux is perpendicular to the plane of the drawing. The flux is set up by an electromagnet or permanent magnet not shown, but well known in the art. 231 and 232 are thin, nonmagnetic sheets slightly thicker than the diameter of the wire 220. When the second pole piece is in place there is formed a cavity shaped like 233 within which the wire can move, from the short length, convex surface of 231 to the longer, concave surface of 232. The direction of motion of the wire is a function of the direction of the magnetic field and the current in the wire 220. By reversing the current in the wire the direction of motion of the wire is reversed.

There is a second magnetic assembly 226 which is identical with 225, except that the polarities of field and current are such that the wire moves from long surface to short surface in 226 while it moves from the short to long surface in 225. By this means the wire loop can remain of constant length around the rollers.

Now, by reversibly braking or clamping the wire at the ends of the assembly 225, the wire can be made to move transversely. The direction of motion will be a function of the side of 225 at which the wire is clamped or is free. For example, if the wire is clamped at 227 and free at 228, as the wire moves in the direction M in 225 and 226, then the wire will move from 221 to 224, or counterclockwise around the loop. If it is clamped at 228 and free at 227, it will move clockwise around the loop.

The wire can be clamped by braking the roller 223, for example, provided there is sufficient friction between the wire and the roller. Or the roller 223 can be provided with a ratchet means to permit rotation in only one direction. Or the roller can be subjected to a controlled small torque in a specific direction, not sufficient to drive the wire by itself, but sufficient to assist the driving effect of 225, 226, in one direction and to oppose it in the other direction, as is well known in the art.

Another way to clamp the wire is by the use of magnetic gaps 227 or 228 similar to those of 225, 226, except there is no appreciable change in length of wire involved within the gap. For example, in 227, the magnetic pole piece is 234 and the thin, nonmagnetic spacer is 235. It has a linear edge 236 that is spaced close to, but not quite touching the wire. When current of the proper direction is passed through the wire, it is pressed against the edge 236 with sufficient force to lock the wire to the assembly 227. When the current is in the other direction, the wire is driven away from the edge 236 and has no friction.

When the currents and fields are in the directions M and N, the wire will move counterclockwise. When the directions of N are reversed with respect to M, then the wire will move clockwise. If the wire is a loop, as shown, the current can be induced into the wire by means such as the transformer with core 237 encircling the wire, and primary winding 238. Since all that is required is a sharp pulse of current to move the wire, a transformer can be used. Or current can be introduced at rollers 221 and 223, as shown, with leads 239 and 240 going to reversing switch 241 and battery 242. Or, if desired, a separate circuit can be completed between any 2 of the 4 rollers, and current in that section of the wire adjusted or reversed at will, without appreciably affecting the current in the other legs.

It is possible also by using 225, 227, and 228, without 226, and without the use of a closed loop of wire, to control a continuous feed of the wire through the system. This wire can be the signal carrying medium, or it can be used to pull another signal carrying medium. Or the loop 220 shown, can turn a roller such as 224 which can be used by means 243, 244, to drive a signal carrying medium such as a tape or strip.

Whereas, I have described FIGURES 11 and 13 in terms of an intermittent drive of a linear element through a recording system, it will be clear that the drive means illustrated by the embodiments of FIGURES 11 and 13 can be used for the intermittent drive of an information medium through a playback or information reading system. This system would therefore be very useful in the design of an automatic machine control, where the instructions to the machine, as read from the information medium, occur at irregular time intervals. Also, as intermittent drive means for linear elements, the embodiments of FIGURES 11 and 13 could, of course, be used for driving other, non-information, linear elements.

While I have described my invention in terms of the foregoing specific details and embodiments thereof, it will be understood that these are by way of illustration only and do not limit in any way the choice of equivalent units or systems as might be devised by one skilled in the art, based on the principles illustrated in this invention. For example, the principle of the continuously rotating magnetic head system in FIGURE 10 might be combined with the embodiment of FIGURE 3, by the use of a continuously rotating mirror. Furthermore, the buffer memory 136 of FIGURE 10, might be used in conjunction with any other of the embodiments to increase the rate of reception of information signals without substantial change in the recording systems illustrated. Also, while I have illustrated the computer operations by electromechanical means, it will be clear that the speed of operation can be increased by the use of digital counters and corresponding controls. Similarly, while I have shown in FIGURE 1, an indicator (29, 30) of the position of the strip that has discrete positions, it will be clear that the addition of a sliding contact potentiometer, or digital shaft encoder, or similar means, driven by control 28, will indicate to a closer degree, the position of the strip.

Throughout this specification I have described the various embodiments as recording systems, for recording digital signals intermittently and sequentially. There are situations arising in the handling of digital information where an intermittent readout of digital information is required. One such application is in the control of machine tools. Here, the intermittent instructions are recorded at unequal spacings along a continuously moving constant speed strip. Since much of the length of such a strip is devoid of information, it is an expensive waste of recording medium. By the principles of this invention, with the substitution of a digital information reading detector, for information recorder means, an intermittent drive of a digital strip having equally spaced information bits will provide the most efficient system. I therefore contemplate this as an important application of my invention.

The scope of this invention is thus properly to be ascertained by reference to the appended claims.

I claim:

1. In a recording system for recording digital information in the form of a pattern of spots arranged in at least one column along a record strip, said information recorded sequentially and intermittently in a pattern of uniformly spaced spots along said column, the improvement comprising recording means for recording said information on said strip, temporary storage means for temporarily storing the information to be recorded, strip traversing means for traversing said strip intermittently past said recording means, recording means traversing means for traversing said recording means past said strip, means for determining the proper position on said strip for the recording of said information, means for determining when the position of said recording means coincides with said proper position, and means to apply a recording signal to said recording means to unload said information from said storage means and to record said information.

2. A digital recording system comprising a record strip, digital recording means for recording digital information on said strip in the form of an equally spaced pattern of spots arranged in at least one column of spots, temporary storage means for temporarily storing a unit of information, strip traversing means to intermittently traverse said strip past said recording means, means to traverse said recording means along said strip, means to determine the proper position on said strip for said unit of information, means for determining when said recording means and said proper position are in coincidence, means to withdraw said unit of information from said temporary storage, and means to record said unit of information at said proper position on said strip.

3. The recording system as in claim 2 in which said recording means is photographic, including a source of optical signals comprising a cathode ray tube, including means to deflect the beam of said tube in the direction along said column.

4. The recording system as in claim 2 in which said recording means is photographic, including a source of optical signals comprising an image of a luminous source, including optical means to traverse said image along said strip.

5. The recording system as in claim 2 in which said recording means is xerographic and comprises at least one electrode spaced from said strip.

6. The recording system as in claim 2 in which said recording means is electrographic and comprises at least one conducting electrode in contact with said strip, said strip comprising electrographically sensitive material.

7. The recording system as in claim 2 in which said recording means comprises an assembly of at least two thin strips of magnetic material and one thin strip of conducting material between said magnetic strips.

8. The recording system as in claim 2 in which said recording means comprises at least one short U-shaped channel formed of thin sheet magnetic material, for which the width of the U is less than its length, and a thin strip of conducting material placed within the arms of the U.

9. The recording system as in claim 2 in which said strip traversing means comprises a driving assembly for intermittently traversing a linear element of said strip through said assembly, comprising (a) A volume of material enclosing a longitudinal passage opening through said assembly, (b) Said passage generally in the form of an opening of rectangular cross-section with two principal longitudinal surfaces, (c) The length of a first surface of said passage between the terminals of said passage being greater by a predetermined amount than the length of the second surface of said passage, (d) Means to selectively lock said element to said passage at each of the terminals of said passage, and (e) Means to force said element from contact along one surface of said passage to contact along the other surface thereof.

10. The apparatus as in claim 9 in which said element is an electrical conductor and said conductor is forced from one surface to the other by electromagnetic means.

11. The assembly as in claim 9 in which said passage has a first surface that is concave toward said passage and said second surface is convex toward said passage.

12. The apparatus as in claim 9 in which said element comprises a nonmetallic strip, and said strip is controlled pneumatically.

13. The assembly as in claim 12 in which said strip is locked to a surface at the terminals of said passage by pneumatic means applied through opening in said surface to the space between said strip and said surface, and said strip is driven from one surface to the other by pneumatic means through openings in at least one of said surfaces.

14. The recording system as in claim 2 in which said strip traversing means comprises a pneumatic assembly for intermittently traversing an element of said strip through said assembly, comprising (a) An upper portion comprising a block of material having a slightly convex bottom surface, (b) A plurality of openings penetrating said convex surface, (c) A lower portion comprising a block of material having a concave upper surface, (d) Said concave surface longer than said convex surface, (e) A plurality of openings penetrating said concave surface near its center and near the ends thereof, and (f) Side plates supporting said upper and lower portions and defining a rectangular passage for said strip.

15. Apparatus as in claim 2 in which said recording means traversing means comprises means for positioning, at switching-controlled speed, said recording means sequentially at a limited plurality of discretely spaced positions in the direction along said strip.

16. Apparatus as in claim 2 in which said recording means traversing means comprises means for positioning, at inertia-controlled speed, said recording means at any one of a continuous range of positions in the direction along said strip.

17. A digital magnetic recording system for recording units of information sequentially on a record web in the form of a predetermined pattern of spots in at least one column of spots comprising, a magnetizable record web, magnetic recording means provided with a recording air gap, means to place said recording air gap in operating relation to said web, means for intermittently traversing said web past said recording air gap, means for traversing said air gap means along said web in a path colinear with the direction of traverse of said web, means to temporarily store said unit of information between the time it is received at said recording system and the time it is recorded on said web, and means to record said unit of information on said web.

18. A magnetic recording system comprising, a magnetizable record web, a magnetic recording head provided with an air gap in recording contact with said web, said air gap formed by the ends of flexible magnetic arm portions of said head providing freedom of movement of said air gap along said medium in a direction perpendicular to the length of said air gap, means to move said air gap along said medium, means to simultaneously move said web past said air gap, and winding means to provide a magnetizing flux to said air gap.

19. A digital recording system comprising, a record strip, digital recording means for recording digital information on said strip in the form of an equally spaced pattern of spots arranged in at least one column of spots, said recording means comprising a plurality of fixed recording elements positioned in a spaced array along said strip, temporary storage means for temporarily storing a unit of information, strip traversing means to intermittently traverse said strip past said recording means, means to determine the proper position on said strip for said unit of information, means for determining which of said recording elements in said array of elements is the one element which is in coincidence with said proper position, means to withdraw said unit of information from said temporary storage, and means to switch said unit of information to said one element to record said information at said proper position.

20. The recording system as in claim 19 in which said recording means is xerographic and comprises a multiplicity of electrodes arranged in a spaced array along the direction of said strip, said electrodes spaced from said strip.

21. The recording system as in claim 19 in which said recording means is electrographic and comprises a plurality of conducting electrodes arranged in a spaced array along the direction of and in contact with said strip, said strip comprising electrographically sensitive material.

22. The recording system as in claim 19 in which said recording means is photographic, including a source of optical signals comprising a multiplicity of electro-optical recording units in an array parallel to said column, and means to switch recording signals from one to another of said units.

23. The recording system as in claim 19 in which said recording means comprises an array of alternate thin strips of magnetic material and conducting material placed in contiguous surface to surface contact, the lengths of said magnetic strips comprising the length of the magnetic recording head air gaps, and the thickness of said conducting strip comprising the width of said recording head air gaps.

24. The recording system of claim 23 in which said array is clamped between the arms of a U-shaped magnetic core, and an electrical winding encircles said core.

25. The recording system as in claim 19 in which said recording means is magnetic and comprises a plurality of recording heads pivoted with air gaps in a fixed array along said strip in the direction of said column, including conductor means in each recording head air gap, and switch means to connect said recording signal to selected ones of said conductor means.

26. In the process of recording digital information sequentially and intermittently on a record strip in the form of patterns of spots arranged in at least one column, said spots arranged in uniform spacing along said column, the steps comprising (a) Intermittently traversing said strip past said recording means in accordance with the arrival of units of information,
(b) Placing said units of information into temporary storage,
(c) Determining the instantaneous position of the proper position of said unit of information to be recorded on said strip with respect to said nominal position of said recording means,
(d) Positioning said recording means as a function of said instantaneous position of said proper position,
(e) Withdrawing said units of information from temporary storage, and
(f) Recording said information on said strip at said proper position.

27. In the process of recording digital information sequentially and intermittently on a record strip in the form of patterns of spots arranged in at least one column, said spots arranged in uniform spacing along said column, the steps comprising (a) Recording on said strip a multiplicity of index spots arranged in uniform spacing related to the required spacing of information spots on said strip,
(b) Receiving a unit of information,
(c) Placing said unit of information into temporary storage,
(d) Determining which of said index spots corresponds to the proper position of said unit of information to be recorded on said strip,
(e) Traversing said strip intermittently past said recording means,
(f) Moving said recording means longitudinally with respect to said strip,
(g) Determing when the position of said recording means coincides with the position of said proper index spot,
(h) Withdrawing said unit of information from storage, and
(i) Recording said information.

28. In an information process in which digital information in the form of a pattern of spots arranged in uniform spacing in at least one column on a record strip are processed by means of digital transducer means, the steps comprising (a) Receiving a unit of information and placing said information into temporary storage,
(b) Intermittently traversing said strip past said transducer,
(c) Determining the proper position on said strip of the unit of information to be processed,
(d) Determining the instantaneous position of said strip with respect to a stationary index,
(e) Positioning said transducer along said strip as a function of the instantaneous position of said proper position with respect to said index,
(f) Removing said unit of information from said storage, and
(g) Transducing said unit of information on said strip.

29. In a magnetic recording system for recording digital information in the form of a pattern of spots arranged in at least one column along a record strip, said information recorded sequentially and intermittently in a pattern of uniformly spaced spots along said column, the improvement comprising, a record strip,
recording means for recording said information on said strip, said recording means comprising a U-shaped yoke of magnetic material, a magnetizing coil wound around at least one leg of said yoke, two flexible arms of magnetic material forming extensions of the legs of said yoke, the outer ends of said arms clamped to opposite faces of a thin spacer of nonmagnetic material so as to form a narrow recording air gap at the ends of said arms, said recording air gap in recording contact with said strip,
strip traversing means for traversing said strip past said recording air gap,
means for traversing said recording air gap along said strip,
means for determining the proper position on said strip for the recording of said information,
means for determining when the position of said recording air gap coincides with said proper position, and
means to apply a recording signal to said coil in accordance with said information.

30. In a digital magnetic recording assembly for recording units of information sequentially on an intermittently moving magnetizable record web, in the form of a predetermined pattern of spots arranged in at least one column of spots arranged parallel to the direction of traverse of said web, the improvement comprising, magnetic digital information recording means comprising
at least one U-shaped magnetic yoke means,
at least one recording head means provided with a narrow air gap and means for placing said air gap in operating magnetic relation to said magnetic yoke means,
a magnetizing winding encircling at least one leg of said at least one yoke,
means for placing said at least one recording head air gap in recording contact with said web,
means for intermittently traversing said web past said recording head air gap,
means for simultaneously traversing said at least one recording head air gap along said web in a path collinear with the direction of traverse of said web, and
means for passing a recording current through said winding to record said information on said web.

31. Apparatus as in claim 30 in which said means for traversing said recording head air gap comprises means to move said recording head air gap and said yoke means together as a unit.

32. Apparatus as in claim 30 in which said means for placing said recording head air gap into operating magnetic relation to said magnetic yoke means includes means to move said air gap with respect to said recording head yoke.

33. Apparatus as in claim 30 in which said means for traversing said recording head air gap comprises means to cyclically move said recording head air gap along said web in a path collinear with the traverse of said web.

34. In a magnetic recording system in which a magnetic recording head provided with an air gap is in recording contact with an intermittently moving magnetizable record web, the improvement comprising, means to move said web intermittently in a direction perpendicular to the long dimension of said recording head air gap,
means to simultaneously move said recording head air gap in a continuous movement along said web collinear with the direction of movement of said web.

35. In the process of recording digital information sequentially and intermittently on a record strip in the form of patterns of spots arranged in at least one column, said spots arranged with uniform spacing along said column, the steps comprising (a) Receiving a unit of information,
(b) Placing said unit of information into temporary storage,
(c) Determining the proper position on said strip for the recording of said unit of information,
(d) Applying an impulse to traverse said strip intermittently past a recording means,
(e) changing the position of said recording means with respect to said strip,
(f) Determining the difference in position between the instantaneous position of said proper position on said strip and the instantaneous position of said recording means, (g) Withdrawing said unit of information from said storage when said difference in position is zero, and (h) Applying a recording signal to said recording means to record said unit of information.

References Cited

UNITED STATES PATENTS

| | | | |
|---|---|---|---|
| 2,479,308 | 8/1949 | Camras | 179—100.2 |
| 2,532,100 | 11/1950 | Howell | 179—100.2 |
| 2,736,770 | 2/1956 | McNaney | 346—74 |
| 2,907,985 | 10/1959 | Doersam et al. | 340—173 |
| 2,979,572 | 4/1961 | Levin | 340—174.1 |
| 3,132,206 | 5/1964 | King | 178—6.6 |
| 3,134,527 | 5/1964 | Willis | 340—174.1 |
| 3,157,748 | 11/1964 | Eldredge | 179—100.2 |
| 3,159,822 | 12/1964 | Hagopian | 340—174.1 |
| 3,205,301 | 9/1965 | Etcheverry | 346—110 X |
| 3,283,068 | 11/1966 | Urry et al. | 179—100.2 |
| 3,303,483 | 2/1967 | Rabinow | 340—174.1 |
| 2,658,950 | 11/1953 | Canfora | 179—100.2 |
| 2,714,048 | 7/1955 | Baird | 179—100.2 |
| 2,832,840 | 4/1958 | Morin | 179—100.2 |
| 2,997,697 | 8/1961 | MacAdam | 179—100.2 X |
| 3,059,049 | 10/1962 | Johnson | 178—6.6 |

BERNARD KONICK, *Primary Examiner.*

J. F. BREIMAYER, *Assistant Examiner.*